March 18, 1958     D. S. CUSI     2,827,169
SCREEN PLATE
Filed Dec. 7, 1954
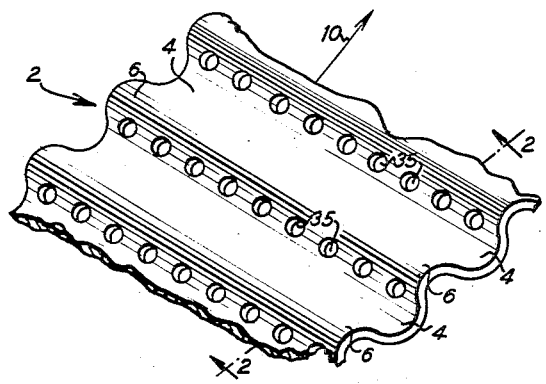
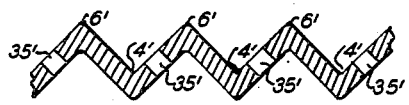
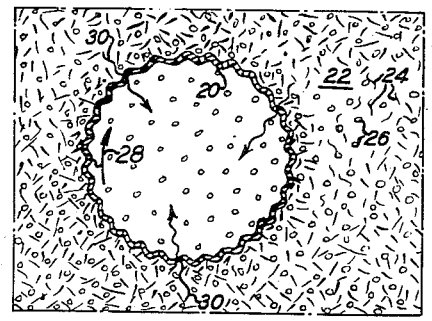
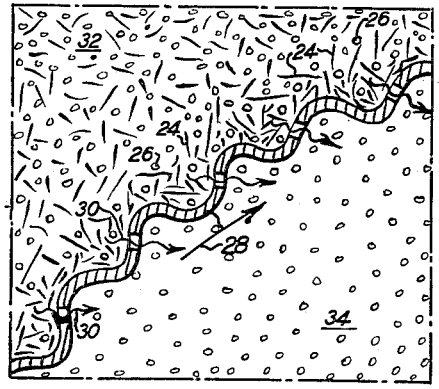
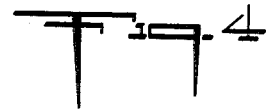
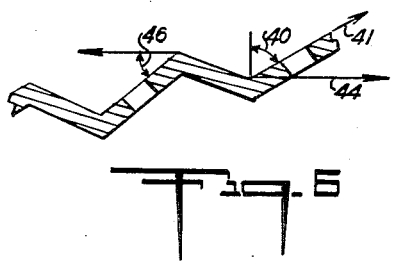
INVENTOR
DANTE S. CUSI
BY
ATTORNEY 2,827,169
Patented Mar. 18, 1958

2,827,169

SCREEN PLATE

Dante S. Cusi, Mexico City, Mexico, assignor to International Pulp Products, Inc., Washington, D. C., a corporation of Panama Application December 7, 1954, Serial No. 473,617

2 Claims. (Cl. 209—397)

This invention relates to a novel screen plate. It relates in particular to a screen embodying a novel relationship between the contour of the plate and the perforations, such that it is capable of achieving novel and improved separations of particulate mixtures.

The invention has among its objects the provision of a screen plate of generally undulant detail contour, which contains perforations in specific positioned relationship to said contour so as to induce and exploit special dynamic effects upon particles suspended in a liquid medium, through which the screen plate moves.

Another object is to provide the above novel type screen plate as a machine or machine element capable of achieving mechanical separations of mixtures which heretofore have been virtually unscreenable, or screenable only with great difficulty and cost.

Still another object is to provide the above screen plate in a variety of general contours adapted to function as a cylindrical screen, flat screen, curved screen, or other of the well known types of screen, and which, while moving through or relative to the liquid, may or may not also vibrate, rotate, oscillate or the like.

Other objects of the invention will appear to those skilled in the art, from the following specification.

Reference is made to the accompanying drawings, which form a part of this specification.

Fig. 1 is a perspective fragmentary view of one embodiment of the invention;

Fig. 2 is a transverse cross section of the screen plate on the line 2—2 of Fig. 1;

Fig. 3 is a section like Fig. 2 but showing a modification;

Fig. 4 is a transverse cross section of a cylindrical screen, made in accordance with the Fig. 1 embodiment and shown in relation to a body of a liquid mixture being screened thereby;

Fig. 5 is an enlarged fragmentary view of a portion of the novel screen plate of Fig. 5, and Fig. 6 is a diagram.

Referring in greater detail to Fig. 1, the screen 2 is undulant in detailed character, possessing alternating valleys 4 and ridges 6 in spaced parallel relationship. Considering the arrow 10 shown in Fig. 1 as denoting the direction of motion of the screen with respect to a surrounding liquid containing a mixture of particles suspended therein, the ordinate axis of the undulations is generally perpendicular to the direction of motion. This is a preferred detailed contour of the screen surface. Nevertheless, as will be seen from the following discussion, the ordinate axis of the undulations may form an acute or obtuse angle with the direction of screen motion. The undulations may vary in vertical transverse section from the sinuous character shown in Figs. 1 and 2 and may take the angular form of Fig. 3 or some other form having rounded or angular contour.

One of the major features of the novel screen plate is the arrangement of the perforations 35. Referring again to Fig. 1, it will be seen that they are spaced, generally in alignment, on the downhill or descending side of the undulations, as established by the screen direction. It could be said that they are on the lee side of the ridges.

The specific shape of the holes may vary considerably. That is, they may be round as shown, or they may be square, oval or the like, or slots might be provided as used in conventional pulp screens, to suit the requirements of the particular screening problem.

Referring to Fig. 4 of the drawing, the screen plate of the invention is shown as adapted to a cylindrical form installation 20. The cylindrical screen is rotated about its own axis in the manner of conventional cylindrical screens. It is shown submerged in a liquid suspension 22 containing fiber material 24 admixed with globular material 26. The direction of rotation of the screen is denoted by the arrow 28.

A typical mixture of material which the screen plate of this invention is adapted to separate is the mixture of bagasse fibers and detached globules of bagasse pith produced by the various depithing methods that are applied to sugar cane bagasse.

The characteristic hydrodynamic features of the screen in such an operation may readily be understood by those skilled in the art, with additional reference to Fig. 5 showing an enlarged section of the screen 20 of Fig. 4 and the simplified diagram of Fig. 6. Flow of the suspending fluid is in the direction of the waved arrows 30, liquid suspension being added to the zone outside the screen (zone 32, Fig. 5) and withdrawn from the zone within it (zone 34, Fig. 5) by suitable feed and discharge connections not shown in the drawings. In other words the waved arrows 30 indicate generally the direction of the hydraulic pressure difference between zones 32 and 34 imposed by this feed and discharge.

This pressure difference and resultant flow, in combination with the rotation of the screen induces the two types of particles 24 and 26 to behave differentially when reaching the immediate region of the screen in zone 32. The rotation and construction of the screen plate is such that the perforations will always be on the downstream or lee side of the undulations. Thus the openings always face backwards with respect to the relative movement of the liquid. Under these conditions, no fibers 24 can pass through the perforations, because the undulations of the screen cause them to ride always on top of the ridges and never get into the valleys.

The paths of the round particles 26, however, will be completely different from those of the fibers. They will be conveyed, with the liquid itself through the perforations in the direction of waved arrows 30.

It will be readily understood that the construction and dimensions of the screen plate, the speed of movement of the screen relative to the liquid, and the character and consistency of the suspension are all factors which affect the specific action of the screen in separating elements 24 from elements 26.

These factors may each vary over wide limits of operability within which satisfactory clean separation occurs. However, the following is presented for informative purposes, to aid in a better understanding of the possibilities of the screen in separating heretofore unscreenable mixtures or mixtures heretofore very difficult and costly to screen.

Preferred features of the screen plate construction include the angle 40 formed between line 41, representing the downstream face of the screen undulation, and the perpendicular to the line 44 representing the direction of screen motion. This angle is the complement of angle 46 formed between the trajectory of the suspension with respect to the screen and the downstream face of the screen undulations.

As previously pointed out, the general hydraulic pressure direction at the screen is shown by the waved arrows 30. The detailed pressure gradients in the immediate region of the screen plate, however, are very complex as to direction and magnitude. They are such that they exert appreciable balanced and unbalanced moments upon suspended particles, the general direction of the unbalanced moments being such as to induce passage through the perforations. Particles which are small enough to be affected by a limited number of these complex pressures at any one time, respond to the moments, and follow the eddying flow of the liquid through the perforations. Particles which possess a dimension large enough so that the effects of the pressures cancel out, cannot respond short of disintegration. As a result they, in large measure, resist passage through the perforations riding over the tops of the undulations just as if an infinitely fine screen were placed there.

Generally the unique screening function of the screen plate of this invention is accomplished by maintaining angle 40 as an acute angle. Its actual value will depend greatly upon the relative speed with which the screen and liquid move with respect to each other. Generally, the greater the speed the larger will be angle 40 and, of course, the smaller angle 46.

The efficiency of screening using the present novel screen plate, depends somewhat upon the consistency of the liquid suspension. This is true of all types of screens as is well known. The main effect of suspending materials in a fluid medium, insofar as screening is concerned, is to achieve separation of one particle from another, and hence afford to each an independent response to the forces developed by the screening process.

The novel screen plate may be adapted to other general contours as heretofore mentioned. Furthermore the undulations of the screen plate may take other forms from those shown in the drawings. For example they may be replaced by individual prisms or pyramids, perforated on the downstream face, or the lips of a flat screen may be bent, raising the upstream lip and lowering the downstream lip.

By virtue of its unique construction, the novel screen plate of this invention does not require cleaning nearly as often as is the case with prior screens. The long fibers or slivers that ride over the tops of the undulations, of course, will not get stuck endwise in the perforations, nor will there be a tendency for the long fibers or slivers to bridge across two adjoining holes.

The screen plate of this invention is particularly adapted to screen such heretofore practically unscreenable mixtures as the pith and fiber suspension obtained from sugar cane bagasse, or a mixture of difibered pulp containing large quantities of unpulped slivers obtained by the selective pulping of agricultural non-woody materials or the differential pulping of mixed woods. It is also particularly adapted to the separation of ray cells from ordinary fibers in wood pulps. Similar applications for screening a wide variety of mixtures of particulate solids will occur to those skilled in the art.

The invention is subject to further modifications as will be readily appreciated once the principle of my invention is understood. Thus in addition to the relative movement above described between the screen and the medium to be screened, the screen may also be subjected to an independent vibratory motion. The screen is adapted as well for centrifugal screening and the like in which the screen is fixed in position and the medium moves in relation thereto.

I claim:

1. The method of separating fibrous from globular particles, and the like, contained in a suspension of such particles in a liquid, comprising immersing in the suspension a screen plate formed with alternate ridges and troughs, extending parallel with each other in a predetermined direction, the ridges merging with the troughs by short imperforate side walls facing in one direction and the ridges merging with the troughs on their opposite sides with perforate walls facing in a different direction from the imperforate walls, creating a pressure differential in the liquid on opposite sides of the plate to force liquid through the perforations, and simultaneously moving the screen and the liquid in a direction relative to each other which is substantially normal to the direction of the ridges and troughs which forces the liquid and solids to impinge against the imperforate side walls so that the fibrous particles by such impingement are urged to flow outwardly away from the perforations and the globular particles are permitted to pass through the perforations with the suspending liquid.

2. Apparatus for separating fibrous from globular particles and the like contained in a suspension of such particles in a liquid comprising a tank for containing the suspension, a screen plate contained in the tank for submersion in the suspension and formed with alternate substantially equal and opposite ridges and troughs extending parallel with each other in a predetermined direction, the ridges merging with the troughs on one side of the ridges by imperforate side walls facing in one predetermined direction and merging with the troughs on the opposite sides of the ridges with side walls facing in a different direction and containing perforations substantially midway between the ridges and troughs, the screen plate being otherwise substantially imperforate, means for applying a liquid suspension of particles to the screen plate with a pressure differential on opposite sides of the plate to cause flow of liquid through the perforations and means for relatively moving the screen plate and the suspension in a direction which is substantially normal to the direction of the ridges and troughs to cause a constant impingement of the suspension against the imperforate side walls of the screen to deflect the fibrous solids from the perforations while permitting the globular particles to pass through the perforations with the liquid.

References Cited in the file of this patent

UNITED STATES PATENTS

| 71,099 | Weston | Nov. 19, 1867 |
| 255,120 | Russell | Mar. 21, 1882 |
| 492,039 | Meurer | Feb. 21, 1893 |

FOREIGN PATENTS

| 812,740 | Germany | Sept. 3, 1951 |